Dec. 31, 1968　　　　G. P. KLEIN　　　　3,419,479
ANODIC PRINTING FOR DETECTING DEFECTIVE SITES
IN VALVE METAL OXIDE FILMS
Filed Nov. 26, 1965

INVENTOR
GERHART P. KLEIN
BY
ATTORNEY

INVENTOR
GERHART P. KLEIN
BY
ATTORNEY

United States Patent Office 3,419,479
Patented Dec. 31, 1968

3,419,479
ANODIC PRINTING FOR DETECTING DEFECTIVE SITES IN VALVE METAL OXIDE FILMS
Gerhart P. Klein, Manchester, Mass., assignor to P. R. Mallory & Co. Inc., Indianapolis, Ind., a corporation of Delaware
Filed Nov. 26, 1965, Ser. No. 509,897
13 Claims. (Cl. 204—1)

ABSTRACT OF THE DISCLOSURE

This is a method for detecting and recording defect sites in metals having an oxide film on the surfaces thereof. The metal has a surface or surfaces thereof coated with an indicator means consisting essentially of about 1 to about 20 g./liter of potassium iodide, about 0 to about 30 g./liter of borax, about 10 to about 50 g./liter of starch, and about 10 to about 60 g./liter of agar-agar in water. The indicator means is contacted with means for recording variations in the indicator means. A current flows through the defects, if any, in the oxide film causing a variation in the indicator means, at the sites of current flow. The variation in the indicator means is recorded by the recording means.

---

The present invention relates to means and methods for producing visible marks on a record surface and more particularly relates to means and methods for detecting and recording defective sites in oxide films of various valve metals and to study the electronic conductivity of the anodic oxide films thereon.

Some of the valve metals are noted for high resistivity oxide films that can be produced by anodic oxidation. The high resistivity can only be realized, however, when materials of extreme purity are used. In most practical cases, heterogenities which disrupt the uniformity of the dielectric are found to be present in the oxide film which gives inferior overall properties. Impurities and several other conditions have been identified as sources for excessive electronic conductivity of anodic oxide films leading to oxygen evolution during formation in aqueous electrolytes in the absence of redox systems other than the $H_2O/O_2$ system and to excessive leakage currents.

The distribution of the electronic current depends upon the distribution of the heterogenities and impurities. It can vary from complete uniformity, both microscopically and macroscopically, to distinct singularity in cases of random contamination.

Measurements in electrolytes do not permit the determination of the distribution of the electronic currents unless the reaction products are immobilized at the site of their creation. These must be detectable by their color or other distinguishing characteristics.

The quantitative evaluation of electronic currents is possible, at least in principle, by measuring the reaction products of redox reactions by standard analytical or electroanalytical methods. However, the quantities of materials to be evaluated are usually so small that the sensitivity of most analytical methods is inadequate.

It is therefore an object of the present invention to provide a printing technique for evaluating anodic oxide films and defects therein.

It is a further object of the present invention to provide an indicator for said printing technique having a distinct color change, negligible diffusion of the oxidized form in the printing electrolyte, chemical stability, stability towards light, and compatibility with the anodic oxide films and substrate metals to be tested.

It is a further object of the present invention to provide a means for utilizing the fact that defects purposely introduced into anodic oxide films of valve metals show electronic conductivity whereas defect free areas are electrically insulating to prepare stencils which can be used to reproduce images laid down in the form of electronically conductive areas in an otherwise insulating material.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Figure 14:
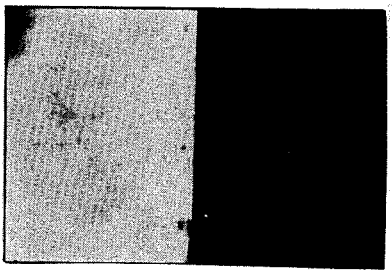
Figure 15:
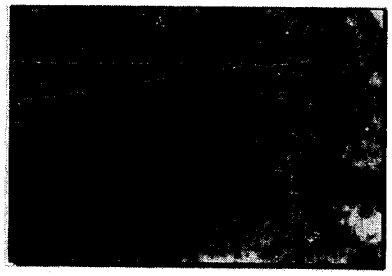

FIGURE 14 is a dynamic anodic print of two sides of a silicon slice, one polished and one rough taken at 1 ma./cm.$^2$ which reached 25 volts in about 2 minutes; and FIGURE 15 is a dynamic anodic print of a mechanically polished and etched silicon slice taken at 1 ma./cm.$^2$ for about 2 minutes.

Generally speaking the present invention provides a printing method using an iodine-starch redox indicator in a solidified electrolyte for application to various valve metals and their anodic oxide films. It has been used to study the electrical conductivity of anodic oxide films on tantalum and niobium and to detect defective sites in oxide films on aluminum.

Applied to titanium, zirconium and silicon, as well as the other valve metals, the method has been used to evaluate the surface condition of the metal substrates. The electrosensitive paper which is prepared by coating a paper with the solution and allowing it to dry thereon, permits perfect electrolytic contact to the printing plate. The present invention further allows the preparation of stencils which can be used to reproduce images laid down in the form of electrically conductive areas in an otherwise insulating material by using the aforementioned sensitized paper which is sensitive to an oxidizing electric current.

From the large number of redox indicators available, only a few qualify for use in the printing technique as applied to anodic oxide films. The indicators were selected on the basis of their sensitivity, redox potential, distinctness of color change, diffusion of the oxidized form in the printing electrolyte, chemical stability, stability towards light, and compatability with the anodic oxide films and substrate metals to be tested. One of the systems found to be most satisfactory on the basis of the aforementioned criteria was the iodide/iodine-starch redox system.

The printing electrolyte consists essentially of an agar-agar gel 0.01–0.1 molar in potassium iodide, 0.05 molar in borax and containing varying amounts of soluble starch. The mixture is kept liquid in a water bath and upon cooling, it solidifies to a rigid, non-tacky gel. The borax serves as both a buffer and a means to make the solidified gel more rigid.

Figure 1:
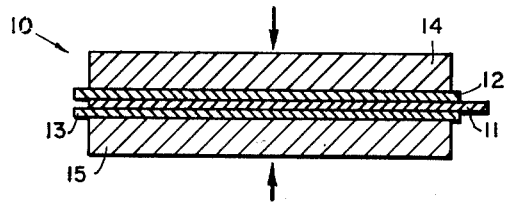
FIGURE 1 is a sectional view of a representative embodiment of the printing arrangement.

To perform a printing test, liquid gel is spread on a specimen in the form of a sheet or foil. Specimen 11, FIGURE 1 is then sandwiched between back-up sheets 12 and 13 and compressed in press 10 between negative plates 14 and 15.

The press comprised a clamp having electrode plates 14 and 15 attached to the jaws thereof, although any suitable design may be employed. Excess electrolyte gel was squeezed out to assure a smooth layer of printing electrolyte in intimate contact with the specimen surface and well bonded to the back-up material which at the same time became soaked with electrolyte. Electrical connections were made to a constant current or constant voltage supply, depending upon the test to be performed. Specimen 11 was connected to the positive output and negative plates 14 and 15 to the negative output of the power supply.

Electronic current oxidized iodide to iodine which, upon reacting with starch led to the formation of a blue to black coloration on a clear white background. The prints may be preserved by bonding them to glass slides with the gel side down followed by drying in an air stream.

Two printing-out modes were used. In the dynamic mode, the printing was done at constant currents, that is, while formation of the oxide was taking place. Printing was carried out in voltage intervals using a new layer of printing medium at each interval thereby obtaining a series of prints which covered the whole range of anodic oxidation of a valve metal up to the scintillation voltage, and which reflected the electronic conductivity and its variation while the oxide film was being grown. In the static mode, the printing was done at constant voltage on a previously oxidized valve metal. This mode was performed at the formation voltage of the film or a fraction thereof, and was used to test the electronic conductivity and evaluate the effect of formation conditions on the conductivity, and further to detect oxide defects.

The minimum sensitivity of the printing technique to detect electronic charges was found to be approximately 1 millicoulomb/cm.$^2$ for the iodide/iodine-starch redox system. Since the electronic current is integrated while a print is being taken, even small currents could be detected if the printing time was extended. However, this is practical only within certain limits because the printing medium tends to dry out. Best results were obtained when the printing time was kept below about 15 minutes. This corresponds to minimum detectable current densities of about 1 ma./cm.$^2$. Point defects could be detected if their current is on the order of 1 nanoamp and higher.

Two factors contribute to the distinctness of the printing marks. The iodine forms an adsorption complex with starch in which the iodine vapor pressure is greatly reduced. Furthermore, the starch, being a high polymer, is immobilized in the matrix of the agar gel. The same is true for the adsorption complex with iodine. The greater the starch concentration, the sharper the prints. The high sensitivity, the color change from colorless to blue-black, the distinctness of the printing marks and their stability are the main advantages of the iodide/iodine-starch redox indicator system over most of the other redox systems which, in most cases, gave very diffuse patterns.

Most oxide forming metals exhibit a particular sensitivity to halide ions which are responsible for corrosion effects which prevent the formation of protective and insulating oxide films. This effect is very noticeable with aluminum where even traces of chloride can be harmful when insulating anodic oxide films are to be formed. The only metals where such effects have been found absent are tantalum and niobium. The printing technique with iodide can be applied to these metals without limitations. It is nevertheless applicable for the detection of imperfections in oxide films on other metals.

The concentration of iodide in the printing electrolyte has to be chosen such that the scintillation potential of the electrolyte is sufficiently high, that is, low concentrations. However, high concentrations are required to suppress oxygen evolution at sites of high local current density. If the iodide concentration is too low, depletion in the layers adjacent the substrate surface will lower the iodine solubility and thus lead to the formation of free iodine which cannot reach unreacted strach. The most suitable iodide concentration varies from application to application but ranges from 1 to 20 g./liter.

Figure 3:
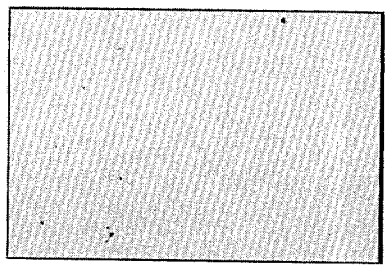
FIGURE 3 is a dynamic anodic print of vacuum annealed tantalum foil taken at 1 ma./cm.$^2$ and 0–150 volt formation.

Anodic oxide films can be formed on tantalum and niobium in electrolytes containing iodide as readily as in more conventional formation electrolytes. The iodide printing-out technique can therefore be applied to tantalum and niobium in either the dynamic or the static mode. For example, a vaccum annealed tantalum foil specimen can be oxidized anodically which prints are taken in the hereinabove described arrangement without any trace of darkening due to the oxidation of iodide to iodine and its reaction with starch as shown in FIGURE 3.

Figure 4:
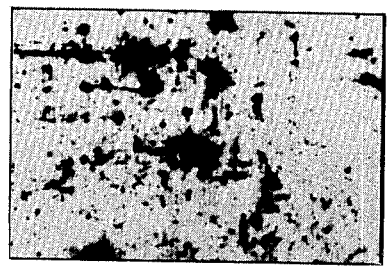
FIGURE 4 is a dynamic print of tantalum foil as received, taken at 1 ma./cm.$^2$ and 0–50 volt formation.
Figure 5:
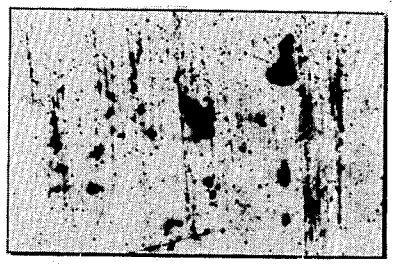
FIGURE 5 is a dynamic anodic print of niobium foil as received, taken at 1 ma./cm.$^2$ and 50–100 volt formation.
Figure 6:
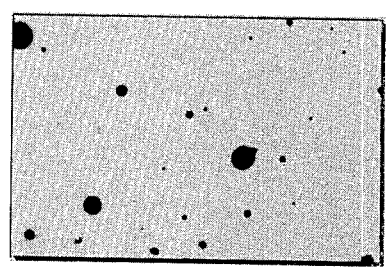
FIGURE 6 is a static anodic print of 99.999% pure aluminum foil electropolished and oxidized to 100 volts in an aqueous ammonium borate solution taken at 40 volts with 30 seconds printing time.

Specimens of foil in the "as received" condition by contrast produced prints which revealed a large number of localized electronically conducting centers as shown in FIGURES 4, 5, and 6.

Figure 7:
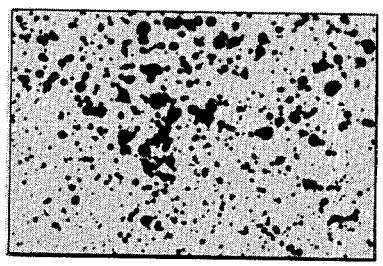
FIGURE 7 is a static anodic print of 99.999% pure aluminum foil as received taken at 40 volts with 30 seconds printing time.
Figure 8:
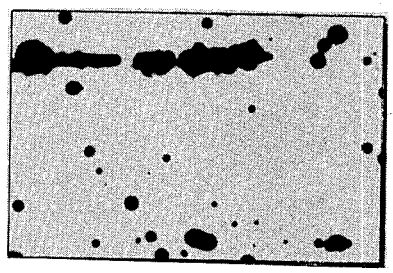
FIGURE 8 is a static anodic print of 99.99% pure aluminum foil as received taken at 40 volts with 30 seconds printing time.
Figure 9:
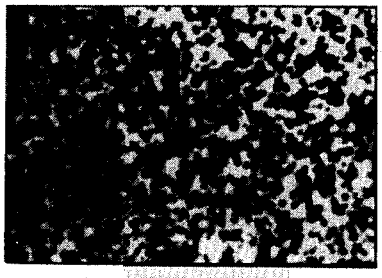
FIGURE 9 is a static anodic print of household aluminum wrap as received taken at 40 volts with 30 seconds printing time.

The printing technique may be applied to aluminum samples by applying from 20 to 50% of the formation voltage with a current in the low milliampere per cm.$^2$ range and using the static printing mode. As can be seen in FIGURES 7–9, characteristic differences of various aluminum samples can be observed and the printing method clearly reveals defective areas in the anodic oxide film. All samples were oxidized in ammonium borate solution to 100 volts and aged for one hour. The results indicate that stated purity is meaningful only if it includes the surface purity.

The printing-out technique as applied to aluminum with iodide-starch as the redox indicator can be considered as a corrosion test which uncovers defects in the oxide films by virtue of the electronic current that accompanies the corrosion reaction. There is a correlation between the electrical properties of the anodic oxide films and the number of corrosion sites detected in the prints.

Figure 10:
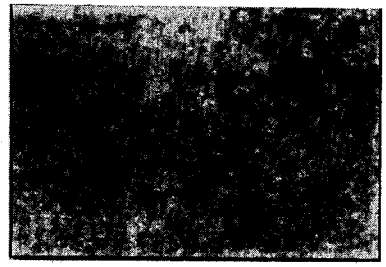
FIGURE 10 is a dynamic anodic print of chemically polished 99.9+% pure titanium sheet taken at 1 ma./cm.$^2$ for 60 seconds.
Figure 11:
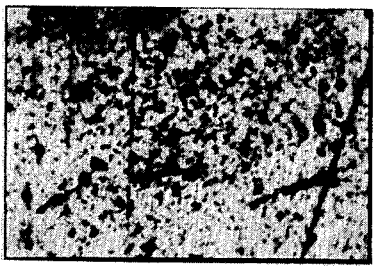
FIGURE 11 is a dynamic anodic print of 99.9+% pure titanium sheet as received taken at 1 ma./cm.$^2$ for 60 seconds.

The behavior of titanium, zirconium and silicon oxide films is intermediate to that of tantalum or aluminum but closer to the latter. FIGURES 10 and 11 show the results of tests performed with 99.9+% titanium sheet. FIGURE 10 was obtained with the sheet in the "as received" condition and FIGURE 11 shows the result obtained with chemically polished material. The various prints reflect characteristic differences in the distribution and density of the electronic conductivity which shows that the printing-out technique, even when the system is not inert with respect to the oxide film, can give valuable information for the evaluation of surface treatments and specimen quality.

Figure 12:
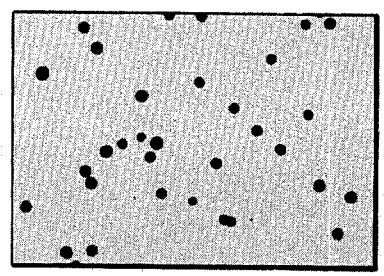
FIGURE 12 is a dynamic anodic print of a chemically polished 99.9+% pure zirconium sheet taken at 1 ma./cm.$^2$ for 60 seconds.
Figure 13:
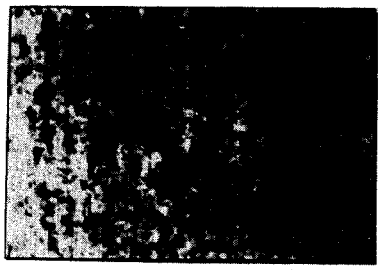
FIGURE 13 is a dynamic anodic print of 99.9% pure zirconium sheet as received taken at 1 ma./cm.$^2$ for 60 seconds.

In FIGURES 12 and 13, two examples of prints or zirconium are given. Zirconium behaved similarly to titanium except for the chemically polished specimen. A more or less uniform distribution of the electronic current was found with titanium compared to a distribution showing very few areas in the case of zirconium.

Silicon could be oxidized to about 25 volts under the printing condition. A comparison of prints, FIGURES 14 and 15, obtained with specimens having differing surface treatments and sloping again revealed characteristic differences which can be utilized for evaluating the quality and surface conditions of silicon specimens.

The above description has shown that the electronic conductivity of anodic oxide films on tantalum and niobium can be studied during the growth of the oxide. The behavior of electronically conducting sites can, therefore, be studied dynamically and statically with respect to the growth of the oxide film. Surface contamination of random distribution was found to be the main reason for high electronic conductivity of "as received" foil. Chemical polishing and vacuum annealing produced specimens essentially free of gross defects.

The printing-out technique can be used for the detection of defects in anodic oxide films on aluminum at potentials well below the formation voltages. No electronic currents were observed with bare aluminum.

In the case of titanium, zirconium, and silicon, the printing-out technique could be used for an evaluation of the surface condition even though the anodic oxidation proceeded only to a few volts. A behavior similar to that of aluminum was found for anodic or thermally grown oxide films when tested at a fraction of the formation voltage or its equivalent.

The detection sensitivity of the printing medium for uniform electronic currents approached the low microamp/cm.$^2$ range in the case of tantalum and niobium. Point defects could be detected if their current was in the nanoampere range.

In the case of aluminum and the other metals the sensitivity could not be evaluated quantitatively. It was found, however, that in the case of aluminum very small defects could be activated, allowing enough time and a sufficiently large fraction of the formation voltage, such that the electronic current accompanying the corrosion reaction would lead to their detection.

The situation may be similar with some of the other metals and their oxide films, even though this was not studied in any detail.

The printing-out method is a quick and reliable method to evaluate the quality of oxide film dielectrics and the surface condition of substrate materials. It is particularly useful in the case of tantalum and niobium where the test is nondestructive. One of the main advantages of the test is that prints can be obtained which record directly the electronic current distribution.

Figure 2:
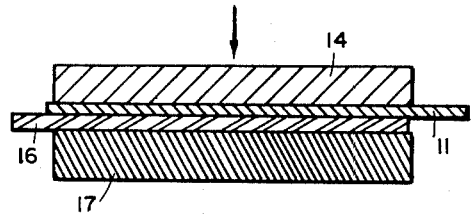
FIGURE 2 is a sectional view of a printing stencil arrangement.

The present invention has been described in conjunction with representative embodiments thereof. For example, as shown in FIGURE 2, specimen 11 may be contacted with an electrosensitive paper 16 and sandwiched between paper 16 and negative plate 14. In this instance, paper 16 is supported by insulating member 17. It will be apparent to those skilled in the art that various changes and modifications may be made therein without departing from the spirit or from the scope of the appended claims.

I claim:
1. A method for detecting and recording defective sites in oxide films of valve metals comprising the steps of: coating an anodized valve metal specimen to be tested with an indicator means, contacting at least one surface of said metal specimen to a background means for recording color changes of said indicator means, compressing said metal specimen and said background means in a means for compressing said metal specimen and said background means in intimate contact, said compressing means having at least one negative plate, and passing an electric current between said negative plate and said metal specimen as the anode, whereby current flows through defects in said oxide film on said metal specimen, said current flow causing oxidation of said indicator means, said indicator means changing color at points of oxidation to form a print thereof on said background means.

2. A method in accordance with claim 1 wherein said metal is selected from the group consisting of aluminum, tantalum, titanium, and zirconium.

3. A method in accordance with claim 2 wherein said indicator means is an iodine-starch redox indicator dispersed in a solidified electrolyte.

4. A method in accordance with claim 2 wherein said indicator means consists essentially of about 1 to 20 g./liter of potassium iodide, 0 to 30 g./liter of borax, 10 to 50 g./liter of soluble starch and 10 to 60 g./liter of agar-agar in water.

5. A method in accordance with claim 4 wherein said indicating means is an electrosensitive paper having a semi-dry coating of the iodide-starch redox indicator thereon.

6. A method for detecting and recording defective sites in the oxide film on silicon comprising the steps of: coating silicon specimen having an oxide film on the surfaces thereof with an indicator means, contacting at least one surface of said silicon specimen to a background means for recording color changes of said indicator means, compressing said silicon specimen and said background means in a means for compressing said silicon specimen and said background means in intimate contact, said compressing means having at least one negative plate, and passing an electric current between said negative plate and said silicon specimen as the anode, whereby current flows through defects in said oxide film on said silicon specimen, said current flow causing oxidation of said indicator means, said indicator means changing color at points of oxidation to form a print thereof on said background means.

7. A method for detecting and recording defect sites in oxide films of valve metals comprising the steps of:
    contacting at least one surface of a valve metal specimen substantially covered with an indicator means with means for recording variations in said indicator means, said specimen forming an oxide on said surface thereof when subjected to a current, and
    passing a current through said specimen as an anode so that said current flows through the defect sites in said oxide film thereby causing variations to appear in said indicator means, said variations in said indicator means being recorded by said means for recording.

8. The method of claim 7, wherein said valve metal is selected from the group consisting of aluminum, tantalum, titanium, zirconium and silicon.

9. The method of claim 7, prior to passing said current through said metallic material, further including the step of pressing said means for recording and said indicator covered metal into intimate contact.

10. The method of claim 7, wherein said indicator means is a redox indicator.

11. The method of claim 10, wherein said redox indicator consists essentially of about 1 to about 20 g./liter of potassium iodide, about 0 to about 30 g./liter borax, about 10 to about 50 g./liter of starch and about 10 to about 60 g./liter agar-agar in water.

12. The method of claim 7, wherein said metallic material has an oxide on the surfaces thereof prior to the step of passing said current through said metal.

13. The method of claim 7, wherein said metallic material is substantially oxide free prior to the step of passing said current through said metal.

References Cited

UNITED STATES PATENTS

| | | | |
|---|---|---|---|
| 2,894,882 | 7/1959 | Strodtz | 204—1.1 |
| 2,902,348 | 9/1959 | Ostrander | 23—230 |
| 3,198,715 | 8/1965 | Fowler et al. | 204—195 |
| 3,206,386 | 9/1965 | Kopito | 204—1.1 |
| 3,285,699 | 11/1966 | Dulski et al. | 23—230 |
| 3,293,155 | 12/1966 | Stone | 204—1.1 |

OTHER REFERENCES

Masters, "Metallurgia," December 1943, pp. 101–104.

JOHN H. MACK, *Primary Examiner.*

T. TUNG, *Assistant Examiner.*

U.S. Cl. X.R.

23—230